R. KISZA.
AUTOMOBILE AND RAILROAD WHEEL.
APPLICATION FILED JULY 24, 1918.
1,293,118.
Patented Feb. 4, 1919.
2 SHEETS—SHEET 1.
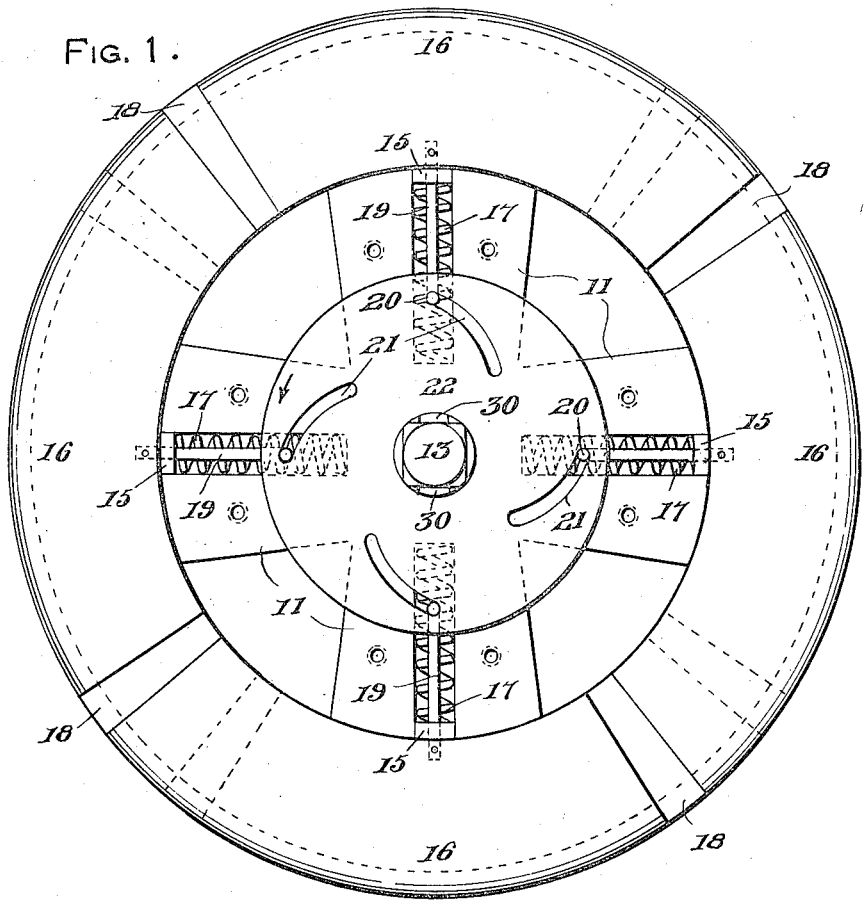
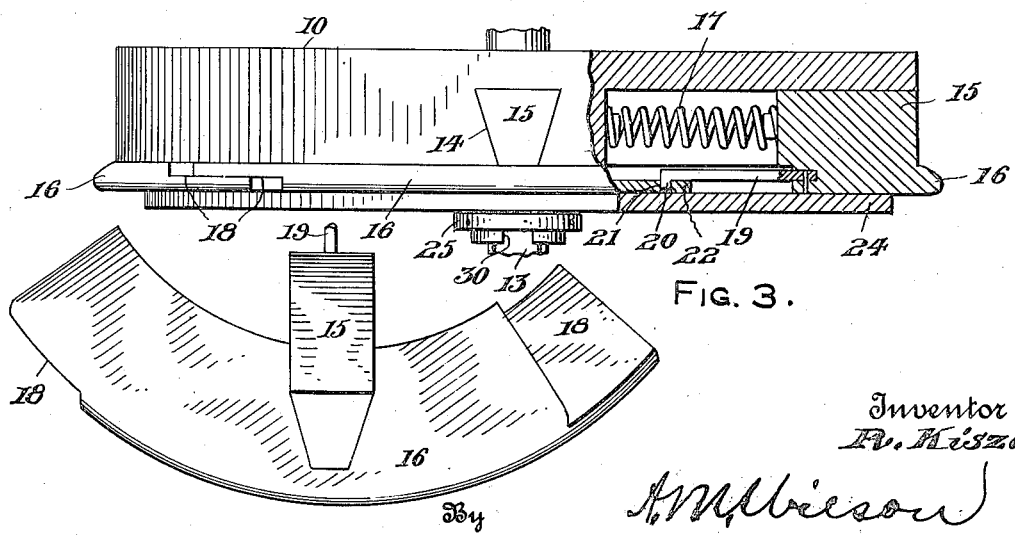

R. KISZA.
AUTOMOBILE AND RAILROAD WHEEL.
APPLICATION FILED JULY 24, 1918.
1,293,118.
Patented Feb. 4, 1919.
2 SHEETS—SHEET 2.
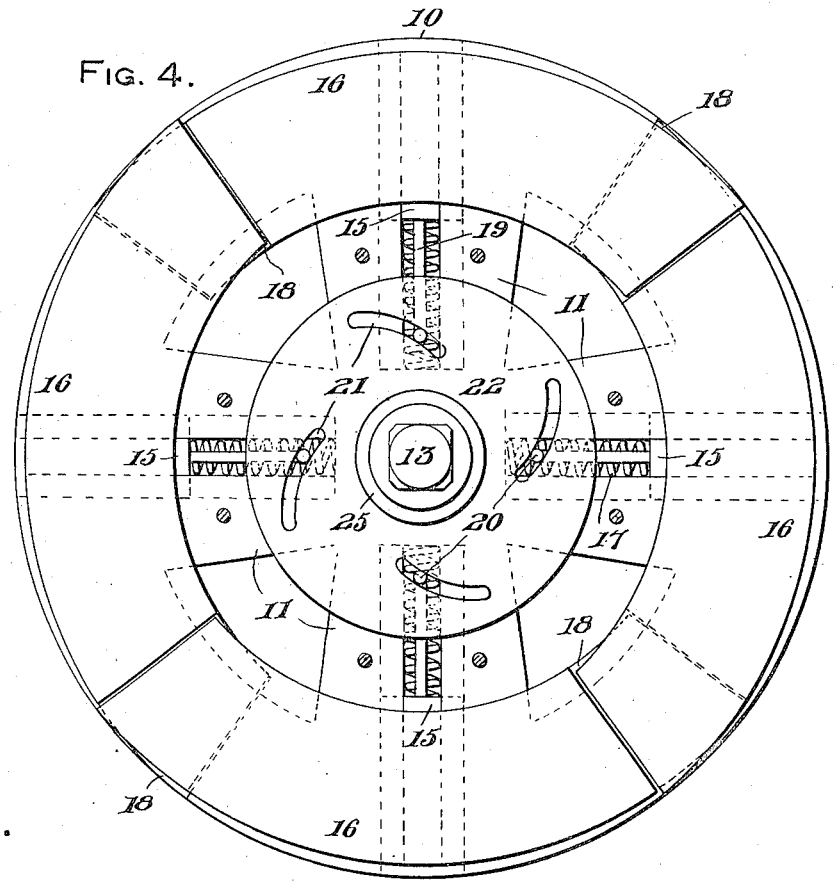
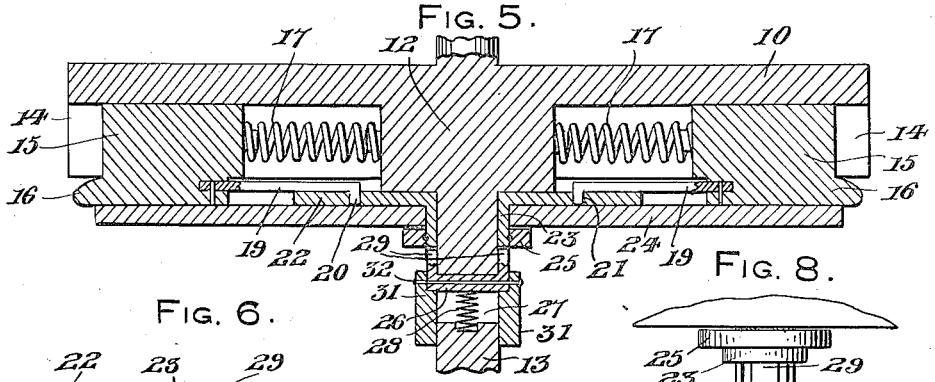
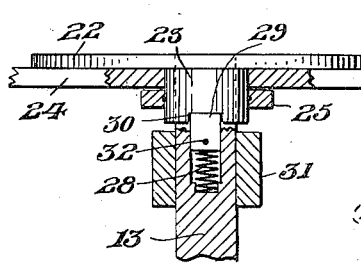
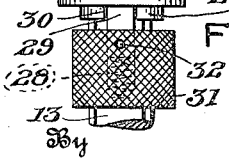
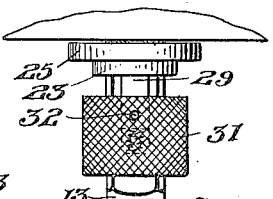
Inventor
R. Kisza
By
N. M. Wilson
Attorney

UNITED STATES PATENT OFFICE.

RYSZARD KISZA, OF CHICAGO, ILLINOIS.

AUTOMOBILE AND RAILROAD WHEEL.

1,293,118.

Specification of Letters Patent.     Patented Feb. 4, 1919.

Application filed July 24, 1918. Serial No. 246,537.

*To all whom it may concern:*

Be it known that I, RYSZARD KISZA, a subject of the Emperor of Austria, declaring intention of becoming citizen of the United States of America, residing at Chicago, in the county of Cook and State of Illinois, have invented certain new and useful Improvements in Automobile and Railroad Wheels, of which the following is a specification.

The primary object of the invention is the provision of a wheel adapted for use upon road traveling vehicles adapted for quickly shifting into a form of flanged wheel for employment in traveling upon a railroad track, the structure possessing great strength for sustaining loads upon either a road or a track.

A further object of the invention is the provision of a wheel having adjustable flanges for adapting the same to travel upon a track, means being provided for retracting the flanges when desired for use upon a road, while the flanges automatically return to their projecting operative positions upon being released.

With these general objects in view and others that will appear as the nature of the invention is better understood, the same will be now fully described in connection with the accompanying drawings and in which like reference characters designate corresponding parts throughout the several views.

In the drawings—

Figure 1 is a side elevation of my form of wheel positioned for traveling upon a track with the front plate removed;

Fig. 2 is an edge view thereof with parts broken away;

Fig. 3 is a perspective view of the inner side of one of the flange sections detached;

Fig. 4 is a view similar to Fig. 1 with the flange sections retracted;

Fig. 5 is a radial sectional view of Fig. 4;

Fig. 6 is a sectional view of the hub portion of the device with the retaining means positioned for holding the flange members retracted;

Fig. 7 is an external view thereof; and

Fig. 8 is a view similar to Fig. 7 showing the position of parts when the flanges are extended.

Referring more in detail to the drawings, a solid form of wheel is provided having a solid form of rim 10 for traveling upon the road bed provided with thick radial spokes 11 and a central hub 12 with an outwardly projecting squared spindle or stub axle 13.

Longitudinal slots 14 are provided in the spokes 11 of dove-tailed formation having complementary formed blocks 15 slidably mounted therein, each of said blocks carrying a segmental flange section 16.

The outer edges of the flange section 16 are adapted to normally project outwardly of the rim 10 circumferentially thereof, said sections being outwardly projected by means of springs 17 provided between the hub 12 and the inner end of each block 15. The opposite ends of the sections 16 are cut away upon opposite sides, as at 18, whereby the adjacent sections are adapted for overlapping and permitting the retraction of said sections as best illustrated in Fig. 4 of the drawings.

A rod 19 is provided within each slot 14 carried by the block 15 mounted therein, while the inner angular ends 20 of the rods 19 freely project through arcuate cam slots 21 in a disk 22 journaled upon the spindle 13 and having an outwardly projecting sleeve 23. A cover plate 24 is preferably mounted upon the sleeve 23 overlying the section 16 as well as the disk 22, while an operating collar 25 is secured to the sleeve 23 outwardly of the plate 24. With the sections 16 normally projected as shown in Fig. 1 of the drawings, it will be seen that the wheel has the appearance of an ordinary flanged car wheel and is adapted for traveling in the usual manner upon a track. Upon turning the collar 25 in the direction indicated by the arrow in Fig. 1 of the drawings, the disk 22 will be revolved in the same direction and by means of the rod ends 20 within the cam slots 21, the rods will be drawn inwardly forcing the flange section 16 toward the hub 12 and inwardly of the periphery of the wheel rim 10 permitting the wheel to travel upon said rim over the road.

A U-shaped latch 26 is shiftably positioned through a transverse slot 27 in the spindle 13 having a positioning spring 28 forcing the said latch toward the sleeve 23 for engaging the opposite ends 29 of the latch within opposite keeper sockets 30 in the outer edge of the sleeve 23. A knurled annulus 31 is slidably mounted upon the spindle 13 secured by means of a pin 32 to the latch 26 and whereby the latch may be retracted against the action of the spring 28 for forcibly drawing the latch ends 29 out of the sockets 30.

The manner of retracting the flange section 16 has been already described in connection with Figs. 1 and 2 of the drawings, it being seen that the spring pressed latch 26 retains the same in the retracted position. The wheel is then ready for use upon the road and when it is desired to employ the same upon a track, the annulus 31 is pulled outwardly which releases the sleeve 23 and the collar 25 may be grasped for returning the disk 22 to its original position assisted by the outward impulse imparted upon the said sections 16 by the springs 17. When the flange sections 16 are outwardly positioned, the engagement of the rod ends 20 with the inner edges of the cam slots 21 sufficiently retains the sections against accidental inward movement for permitting the use of the wheel upon a track. The spring 17 may be provided of sufficient strength to automatically project the segment 16 upon releasing the latch 26 whenever the segments are retracted. The wheel possesses great strength and the dove-tailed engagement between the segment blocks 15 and the rim 10 provides a flange structure capable of withstanding ordinary traffic uses, while the same by reason of its adjustable flange is especially serviceable in connection with mine cars as well as motor trucks for army use.

What I claim as new is:—

1. In combination with a wheel having a rim, slotted spokes, a central hub and a spindle projecting from the hub, blocks slidably mounted in the slots of said spokes, overlapping segmental flange sections carried by said blocks flatly engaging the side of the rim, projecting springs for said sections positioned between the said blocks and hub, inwardly extending rods carried by said blocks, having angularly projecting ends, a disk journaled upon said spindle provided with cam slots into which said rod ends are positioned, an outwardly projecting sleeve upon said disk, an operating collar carried by said sleeve, and a cover plate journaled upon the sleeve between said collar and disk.

2. In combination with a wheel having a rim, slotted spokes, a central hub and a spindle projecting from the hub, blocks slidably mounted in the slots of said spokes, overlapping segmental flange sections carried by said blocks flatly engaging the side of the rim, projecting springs for said sections positioned between the said blocks and hub, inwardly extending rods carried by said blocks, having angularly projecting ends, a disk journaled upon said spindle provided with cam slots into which said rod ends are positioned, an outwardly projecting sleeve upon said disk, an operating collar carried by said sleeve, and a cover plate journaled upon the sleeve between said collar and disk, the said sleeve having opposite keeper sockets in its outer end, a double locking latch carried by said spindle, a spring engaging said latch normally positioning the latch against the adjacent outer end of the sleeve for seating within said recesses when the disk is in its shifted position with the flange sections retracted and a knurled annulus slidaby mounted upon the spindle secured to said latch adapted for disengaging the latch from the sleeve upon an outward movement of the annulus whereby the flange sections are released for automatic return to their projected operative positions.

In testimony whereof I affix my signature.

RYSZARD KISZA.